3,130,182
WHOLLY AROMATIC POLYHYDRAZIDES
August Henry Frazer, Wilmington, Del., assignor to E. I. du Pont de Nemours and Company, Wilmington, Del., a corporation of Delaware
No Drawing. Filed Aug. 11, 1960, Ser. No. 48,844
13 Claims. (Cl. 260—78)

This invention relates to a novel class of high molecular weight aromatic condensation polymers. More specifically, it relates to a class of high molecular weight fiber- and film-forming aromatic condensation polymers derived from hydrazine, which polymers exhibit high melt temperatures, surprising solubility, and unusual stability.

Some high molecular weight fiber- and film-forming condensation polymers are well known and are commercially used. For example, the polyamide of structure

—NH—(CH$_2$)$_6$—NH—CO—(CH$_2$)$_4$—CO— the polyurethane of structure

—NH—(CH$_2$)$_6$—NH—CO—O—(CH$_2$)$_4$—O—CO— and the polyester of structure

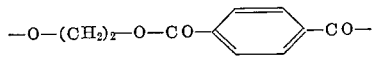

have all been manufactured on a large scale.

While these polymers may exhibit desirable properties in some respects, superior polymers, which are characterized by high melt temperature, high stability, and other outstanding properties and combinations of properties, are continuously sought.

In the past, aromatic diamines and aromatic diacids have been suggested as modifying ingredients to replace a part, or occasionally all, of the aliphatic diamines and aliphatic diacids conventionally employed in polyamide products and processes. In general, the properties of such modified polymers are often improved in degree for certain purposes, but no real change in kind has resulted. It has been understood and recognized by those skilled in the art that both aromatic ingredients were not to be used together except in minor proportions. This understanding was brought about by the difficulties inherent in the preparation of polyamides which contain high proportions of aromatic diamines and aromatic diacids, and such polyamides were impossible to prepare in high molecular weight.

Still more recently all-aromatic polyamides have been provided and quite unexpectedly it has been found they are generally insoluble in conventional polyamide solvents such as phenols but soluble in certain other solvents. Moreover, it has been found they cannot be prepared by conventional procedures but require novel processes. Hence, real differences in kind exist in the all-aromatic polyamides from the conventional all-aliphatic or aliphatic-aromatic polyamides. Similar surprising and unpredictable results have been found with several other classes of all-aromatic polymers, such as the all-aromatic polycarbonates and the all-aromatic polyesters.

Some polymers derived from hydrazine have been prepared. One such group comprises the polyaminotriazoles based on two molecular proportions of hydrazine and one molecular proportion of dibasic acid. Another such group comprises the polyhydrazides based on equimolar proportions of hydrazine and dibasic acid.

The prior art teaches high molecular weight, film- and fiber-forming aliphatic polyhydrazides and processes for their preparation. It also teaches that certain aromatic constituents may be employed as modifying ingredients in such processes. Thus, U.S. Patent 2,615,862 shows that aliphatic polyhydrazides and aliphatic-aromatic polyhydrazides are known.

All-aromatic polyhydrazides represent a novel polymer class. As pointed out above, based on prior polymer experience, one skilled in the art would expect that prior art processes for making polyhydrazides would be of limited value or even inoperable for preparing such polymers. It would further be expected that such polymers would be difficult or impossible to fabricate into films and fibers by conventional melt or solution methods.

It is the object of this invention to provide all-aromatic polyhydrazides.

It is an object of this invention to provide polyhydrazides particularly valuable for conversion to poly-1,3,4-oxadiazoles.

It is the object of this invention to provide a process for the preparation of high molecular weight all-aromatic polyhydrazides.

It is an object of this invention to provide a process for fabrication of all-aromatic polyhydrazides into films and fibers.

It is an object of this invention to provide films and fibers of all-aromatic polyhydrazides.

Other objects will appear hereinafter.

In accordance with this invention, there is provided a novel class of film- and fiber-forming hydrazine-based condensation polymers which are characterized by the following recurring structural unit

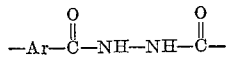

wherein —Ar— represents a divalent aromatic radical having at least three nuclear atoms between points of attachment, such as that derived from an aromatic dicarboxylic acid having at least three nuclear atoms between carboxyl groups. The divalent aromatic radical in each recurring structural unit may be the same (homopolyhydrazides) or different (copolyhydrazides), with the proviso that at least about 35 mol percent of the aromatic radicals in any polyhydrazide be other than para-phenylene radicals. By "aromatic" is meant not only the classical definition, viz. "derived from benzene," but also the modern definition, viz. "having the character of benzene." Hence, —Ar— represents a resonance-stabilized ring system, which may be either benzene-aromatic or heteroaromatic. These polymers are of high molecular weight as is shown by inherent viscosities of at least 0.4 as measured in dimethyl sulfoxide. They are also very high melting, having melt temperatures of at least 300° C.

The formation of coherent films and fibers in polyhydrazides is associated with an inherent viscosity of at least 0.3. Drawability and toughness are associated with an inherent viscosity of at least 0.4. For formation of shaped articles having the highest utility, it is preferred that the polymers have an inherent viscosity of at least 0.5.

The aromatic polyhydrazides having inherent viscosities of at least 0.4 of this invention have polymer melt temperatures of at least 300° C. By proper choice of structure, as will be disclosed more fully herein, polymers having melt temperatures of at least 350° C. are obtained. These are a preferred group.

The polymers of this invention may be prepared by a novel low-temperature solution technique. In accordance with this procedure, hydrazine or an aromatic dihydrazide is reacted with an aromatic diacid chloride in a solvent medium. The reaction may be carried out by combining an aromatic diacid chloride or a mixture of aromatic diacid chlorides with hydrazine or by combining one or more aromatic diacid chlorides with one or more dihydrazides of aromatic dicarboxylic acids. It is desirable that such proportions are chosen that there is present one mol of aromatic dibasic acid chloride for each mol of hydrazine or aromatic dihydrazide. It is preferred to use preformed dihydrazides rather than hydrazine.

The solvent employed is selected from the group of weakly basic materials which not only exhibit high solvent power for the polymer being formed but also serve as acceptors for the hydrogen chloride which is evolved in the course of the polymerization. Obviously, the solvent should be substantially non-reactive with the polymer-forming intermediates under polymerization conditions. Suitable solvent media are N-methylpyrrolidone or hexamethylphosphoramide. Simple homologs of these, the N-substituted amide solvents, preferably containing no more than one additional carbon atom for each nitrogen atom, such as 5-methyl-N-methylpyrrolidone, also may be used. Inorganic chlorides soluble in the reaction solvent are often beneficial since they improve the solvent power of the amide for aromatic polyhydrazides; among these hydrogen chloride and lithium chloride are preferred additives.

The polymers of this invention are prepared by a polymerization conducted at low temperatures, i.e., not exceeding 100° C., and generally at room temperature or below. The reaction mixture may be cooled during polymerization in an ice bath. Such low temperatures are desirable to minimize reaction of the solvent with the reactants, since the basic solvents employed are appreciably reactive with acid chlorides at elevated temperatures, and particularly above about 100° C.

The polymerization is best conducted by dispersing the aromatic dihydrazide in the amide solvent, cooling the solution to 0–30° C., and slowly adding the aromatic diacid chloride with stirring while maintaining the temperature at 0–30° C. The reaction is permitted to continue until high molecular weight aromatic polyhydrazide is formed, as is evidenced by an increase in viscosity. The reaction is generally complete in about 2 to 4 hours, although longer times may be employed. While it is preferable to conduct the polymerization reaction at a temperature below about 30° C., it is possible, as has been pointed out earlier, to employ higher temperatures. At these higher temperatures the reaction is considerably faster, e.g., several minutes at 75° C. Where the higher temperatures are employed, it is preferred that the reaction medium be hexamethylphosphoramide, inasmuch as this solvent is the least reactive toward the diacid chlorides.

Representative and suitable aromatic dicarboxylic acid chlorides and aromatic dicarboxylic acid hydrazides having at least three nuclear atoms between functional groups are derivatives of diacids of benzene, such as isophthalic acid and terephthalic acid, of biphenyl, such as bibenzoic acid, of naphthalene, such as naphthalene-1,4-dicarboxylic acid and naphthalene-2,6-dicarboxylic acid, of pyridine, such as pyridine-2,5-dicarboxylic acid, of pyrazine, such as pyrazine-2,5-dicarboxylic acid, of pyrrole, such as pyrrole-2,5-dicarboxylic acid, of thiophene, such as thiophene-2,5-dicarboxylic acid, of furan, such as furan-2,5-dicarboxylic acid and of quinoline, such as quinoline-2,6-dicarboxylic acid. It is preferable to employ reactants such that the parent aromatic dicarboxylic acids contain fewer than about 18 carbon atoms. When the aromatic rings are hetero-aromatic, it is preferred that the hetero atoms be nitrogen.

The aromatic nuclei may bear substituents such as lower alkly groups, aryl groups, halogen atoms, ether linkages, thioether linkages, and other similar non-reactive substituents. Examples of such substituted aromatic dicarboxylic acids are 5-nitroisophthalic acid and tetrachloroterephthalic acid. The acid halide reactants bearing substituents are exemplified by 4-fluoroisophthaloyl chloride, 4-chloroisophthaloyl chloride, 5-chloroisophthaloyl chloride, 4-bromoisophthaloyl chloride, 4,6-dibromoisophthaloyl chloride, 2-methylisophthaloyl chloride, 4,6-dimethylisophthaloyl chloride, 4-methoxyisophthaloyl chloride, 5-methoxyisophthaloyl chloride, 2,4-dimethoxyisophthaloyl chloride, 2-nitroisophthaloyl chloride, 4-nitroisophthaloyl chloride, 5-nitroisophthaloyl chloride and 4,6-dinitroisophthaloyl chloride. Polymers prepared from the derivatives of dicarboxylic acids whose aromatic nuclei bear substituents of the above types may exhibit melt temperatures either higher or lower than the unsubstituted polymers. While those polymers, whose parent dicarboxylic acids bear non-reactive substituents, which exhibit melt temperatures of at least 350° C. are of interest within the preferred class of polymers, the unsubstituted polymers, in accordance with this invention, are a particularly preferred group, inasmuch as these polymers invariably have melt temperatures above 350° C.

By a "non-reactive substituent," as referred to above, is meant a grouping of atoms which will not react appreciably with either aromatic carboxylic hydrazides or aromatic carbonyl chlorides under the polymerization conditions. Suitability of a substituent may be tested by determining whether a compound formed by attaching the substituent to an aromatic ring, when present during polymerization in equivalent amounts, will not decrease below 0.4 the inherent viscosity of a polymer produced by combining isophthalic dihydrazide and isophthaloyl chloride in the process of this invention.

It will be apparent to those skilled in the condensation polymer art that more or less random copolymers may be produced by the process of this invention, e.g., a mixture of two or more aromatic diacid chlorides may be condensed with hydrazine. The novel process of this invention, however, permits the preparation of an ordered and highly desirable group of copolymers of structure

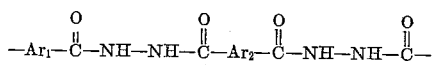

wherein —Ar$_1$— and —Ar$_2$— are different aromatic rings. These polymers, in which two different aromatic hydrazide units alternate in the polymer chain, are found, surprisingly, to have high solubility and easy processibility (which characteristics are generally noted with copolymers) and high crystallinity and high strength (which properties generally are exhibited by homopolymers). That this combination of properties may be embraced within one class of polymeric materials contributes greatly to the desirability and utility of such alternating copolyhydrazides. These polymers may be prepared either by reacting the dihydrazide of the first aromatic diacid with an equimolar amount of the diacid chloride of the second aromatic diacid, or the same polymers may be formed by the same process in which the two aromatic nuclei are interchanged (i.e., by reaction of the dihydrazide of the second aromatic diacid with an equimolar quantity of the diacid chloride of the first aromatic diacid). A preferred composition is that in which —Ar$_1$— is meta-phenylene and —Ar$_2$— is a different aromatic nucleus, preferably paraphenylene.

The aromatic dihydrazides employed in this invention may be prepared by any of several well-known methods. Particularly convenient is the preparation from a dialkyl ester and hydrazine as is illustrated in Preparation A.

PREPARATION A

To a refluxing solution of 9.76 grams of dimethyl pyridine-2,5-dicarboxylate in 100 ml. of ethanol is slowly added 9.81 grams of hydrazine hydrate and refluxing is continued for 3½ hours. The light yellow product which precipitates is collected by filtration, washed with ethanol, and dried. It is recrystallized several times from hot water until nearly colorless. The melting point is 268–9° C. (dec.).

The aromatic dicarbonyl chlorides employed in this invention may be prepared by any of several well-known methods. Particularly convenient is the preparation from an aromatic dicarboxylic acid and thionyl chloride as is illustrated in Preparation B.

PREPARATION B

A mixture of 22 grams of pyrazine-2,5-dicarboxylic acid and 60 ml. of thionyl chloride with 5 drops of dimethylforamide is refluxed for 4 hours after the initial rapid evolution of hydrogen chloride. The excess thionyl chloride is evaporated under reduced pressure. The brown residue is sublimed in vacuo and twice recrystallized from hexane. The melting point is 142–4° C. for the product.

In order to compare and contrast the prior art aliphatic polyhydrazides with the novel aromatic polyhydrazides of this invention and processes for their preparation, the polymers shown in Table 1 have been prepared and characterized. In each case the reactants were combined in 90 grams of nitrobenzene and heated 3–4 hours at 180° C.

Table 1

| Dihydrazide | Weight (g.) | Acid Component | Weight (g.) | PMT,[a] ° C. | Solubility[b] |
|---|---|---|---|---|---|
| Adipic | 13.06 | Diethyl oxalate | 10.95 | 300 | Insoluble. |
| Do | 13.06 | Sebacic acid | 15.17 | 325 | Do. |
| Do | 13.06 | Terephthalic acid. | 12.45 | 315 | Do. |
| Azelaic | 16.22 | Oxalic acid dihydrate. | 9.45 | 300 | Do. |
| Do | 16.22 | Diethyl oxalate | 10.96 | 295 | Do. |
| Do | 16.22 | Isophthalic acid | 12.45 | 320 | Do. |

[a] Polymer melt temperature.
[b] To boil in each of water, ethanol, benzene, chloronitrobenzene, formic acid, cresol, dimethylacetamide, dimethyl sulfoxide.

The only solvent found for these polymers is concentrated sulfuric acid, which degrades the polymers and hence inherent viscosity measurements necessary to evaluate high molecular weight characteristics could not be obtained.

Surprisingly, the novel aromatic polyhydrazides of this invention often show a high degree of solubility in dimethylamide solvent, particularly when there is present a soluble inorganic chloride. Certain members of this novel polymer class may be fabricated into useful shaped objects from such solutions.

Dimethyl sulfoxide is a particularly powerful and useful solvent for the polymers of this invention. It will dissolve any aromatic polyhdrazide providing the polymer does not contain more than about 65 mol percent paraphenylene radicals. Solutions are obtained by mild heating, often at 100° C. or less, and are stable at room temperature. High solids solutions, in the range 20–50 percent solids, are readily obtained and are eminently suited for the casting of films and the spinning of fibers. This solvent appears to be unique in its high solvent power for these polymers.

In order to more fully show the special quality of the novel process of this invention, aromatic polyhydrazides were prepared using a prior art process for aliphatic polyhydrazides. Preparations were made using 90 parts of nitrobenzene with heating for 3–4 hours at 180° C. with results as shown in Table 2.

Table 2

| Dihydrazide | Parts | Acid Component | Parts | PMT[a], ° C. | $\eta_{inh}$[b] |
|---|---|---|---|---|---|
| Isophthalic | 14.55 | Isophthalic acid | 12.45 | 250 | 0.08 |
| Do | 14.55 | Dimethyl isophthalate. | 14.55 | 260 | 0.14 |
| Do | 14.55 | Isophthaloyl chloride. | 15.21 | 280 | 0.15 |
| Do | 14.55 | Terephthalic acid. | 12.45 | 290 | 0.06 |
| Do | 14.55 | Dimethyl terephthalate. | 14.55 | 255 | 0.21 |

[a] Polymer melt temperature.
[b] Inherent viscosity in dimethyl sulfoxide.

Each of the products in Table 2 was found not to give coherent films either by melt pressing or by solution casting. It can be seen that the products did not have inherent viscosities of at least 0.4 nor did they have melt temperatures of at least 300° C.

The differences in kind between the novel products and processes of this invention over the prior art are further shown in Table 3, in which are shown attempted preparations of typical prior art aliphatic polyhydrazides using the novel process of this invention. In each case the product was insoluble in dimethyl sulfoxide at 100° C. and only partly soluble in low concentrations in this solvent at the boil with precipitation on cooling, and so an inherent viscosity could not be determined. Each of the products failed to produce tough and drawable fibers and films and only brittle, friable films and fibers were obtained from the melted polymers.

Table 3

| Dihydrazide | Weight, g. | Diacid Chloride | Weight, g. | PMT,[a] ° C. | Solubility[b] |
|---|---|---|---|---|---|
| Adipic | 1.74 | Adipic | 1.83 | 328 | Insoluble. |
| Do | 1.74 | Sebacic | 2.39 | 308 | Do. |
| Azelaic | 2.16 | Adipic | 1.83 | 318 | Do. |
| Do | 2.16 | Sebacic | 2.39 | 280 | Do. |

[a] Polymer melt temperature.
[b] In dimethyl sulfoxide.

It is well known in the fabrication of linear condensation polymers that as one employs polymers with higher and higher melt temperatures it becomes more and more difficult to produce tough, orientable fibers and films. Generally those polymers having melt temperatures above about 300° C. are melt spun only with difficulty. It is therefore preferred with very high melting polymers to spin from solution, i.e., wet spinning or dry spinning. It is also well recognized that polymers having melt temperatures above about 300° C. are very poorly soluble, especially in simple, low-cost, low-boiling solvents. It is thus highly surprising and desirable to find high melting polymers that are also easily soluble in a simple solvent such as are provided by this invention.

The following examples will illustrate the present invention, but are not intended to limit it in any way. In these examples, inherent viscosities have been determined in accordance with the following equation:

$$\text{Inherent viscosity} = \frac{\ln \eta_{rel}}{c}$$

The relative viscosity ($\eta_{rel}$) may be determined by dividing the flow time in a capillary viscometer of a dilute solution of the polymer by the flow time for the pure solvent. The concentration ($c$) is generally 0.5 gram polymer per 100 ml. solution. The measurements are made at 30.0° C. in dimethyl sulfoxide. Each of the polymers described in these examples may be cast from dimethyl sulfoxide solution to form clear, tough films.

EXAMPLE I

A solution of 48.5 grams of isophthalic dihydrazide in 325 ml. of N-methylpyrrolidone containing 15 grams of lithium chloride is cooled in an ice bath. To this stirred solution are added 50.75 grams of isophthaloyl chloride, and the reaction mixture is stirred overnight. The resulting polymer is precipitated by pouring the solution into water, and it is washed free of acid. The white polymer is washed once with methanol and dried. It is found to exhibit a polymer melt temperature of 370° C. and an inherent viscosity of 0.84.

In a similar experiment in which only 10 grams of lithium chloride are used and the diacid chloride is added in 5 equal portions at 5 minute intervals, the inherent viscosity is 1.50.

In a similar experiment using 58.2 grams of the dihydrazide, 390 grams of solvent, 18 grams of lithium chloride, and 60.90 grams of the diacid chloride added all at once, a solution of poly(isophthalic hydrazide) is obtained. This is wet spun into water containing N-methylpyrrolidone and calcium hydroxide. Drawable fibers are obtained. The inherent viscosity of the polymer is 0.54.

In another experiment, 2.54 grams of isophthaloyl chloride is added in two equal portions to a stirred and cooled solution of 2.43 grams of isophthalic dihydrazide in 20 ml. of 5-methyl-N-methylpyrrolidone. After 2 hours the mixture is precipitated into water and the product washed and dried. Inherent viscosity is 0.45.

EXAMPLE II

To a solution maintained at 0° C. of 6.4 grams of hydrazine in 140 ml. of hexamethylphosphoramide is added a solution of 40.6 grams of isophthaloyl chloride in 30 ml. of dichloromethane. After stirring overnight, polymer with an inherent viscosity of 0.53 is obtained.

EXAMPLE III

To a solution of 48.5 grams of isophthalic dihydrazide in 325 ml. of N-methylpyrrolidone cooled in ice water are added five 10.15 gram portions of terephthaloyl chloride at five minute intervals. The reaction mixture, cooled by means of an ice bath, is stirred overnight, and the polymer is separated by dilution with water. The product is washed free of acid with water and is further washed once with methanol. After drying, it is found that there has been produced a quantitative yield of polymer which exhibits a polymer melt temperature of 400° C. An inherent viscosity of 1.50 is measured.

In a similar preparation using 97.0 grams of isophthalic dihydrazide, 950 ml. of hexamethylphosphoramide, and 101.5 grams of terephthaloyl chloride added in portions over one hour, polymer with inherent viscosity of 0.88 is obtained in a quantitative yield.

EXAMPLE IV

A solution is prepared by dissolving 9.7 grams of isophthalic dihydrazide in 90 ml. of hexamethylphosphoramide while cooling in an ice bath. To this solution are added 3.38 grams of isophthaloyl chloride and 6.77 grams of terephthaloyl chloride, and the reaction mixture is stirred overnight. The product is isolated and purified by dilution with water, filtration, washing with water until free of acid, and washing with methanol. The polymer exhibits an inherent viscosity of 0.59 and a polymer melt temperature of 390° C.

EXAMPLE V

A 0.97 gram sample of dry isophthalic dihydrazide is dissolved at 0–5° C. in 20 ml. of N-methylpyrrolidone containing 0.4 gram of lithium chloride. To the resulting solution is added under stirring 1.26 grams of naphthalene-2,6-dicarbonyl chloride in several portions. The total mixture soon forms a clear solution and is allowed to react overnight. The polymer is separated from the clear and viscous solution by dilution with alcohol. The product is washed with alcohol and dried. It exhibits a polymer melt temperature of 365° C. (dec.) and has an inherent viscosity of 0.90.

EXAMPLE VI

A solution of N-methylpyrrolidone containing 1.94 grams of isophthalic dihydrazide is prepared and cooled by an external ice bath. The solution is stirred and to it are added 2.04 grams of pyrazine-2,5-dicarbonyl chloride. The reaction is continued overnight. The reaction mixture is then poured into 95% ethanol to precipitate the polymer. The polymeric product is filtered and washed with 95% ethanol. The polymer melt temperature of the dried product is 380° C. and its inherent viscosity is 0.70. The polymer is poly(isophthalic-alt-pyrazine-2,5-dicarbonxylic hydrazide).

EXAMPLE VII

One mol of 5-t-butylisophthalic acid and 4 mols of thionyl chloride with 1 ml. of pyridine are heated under reflux for 9 hours. Excess thionyl chloride is removed by distillation and the residue is recrystallized from hexane. The resulting 5-t-butylisophthaloyl chloride, M.P. 44–46° C., is further purified by distillation, B.P. 122–123° C./0.5 mm.

To a solution of 1.94 grams of isophthalic dihydrazide in 20 ml. of hexamethylphosphoramide is added 2.59 grams of 5-t-butylisophthaloyl chloride with stirring. After 16 hours at room temperature the viscous solution is poured into water to precipitate the polymer. After washing and drying, the polymer is found to have a polymer melt temperature of 320° C. and an inherent viscosity of 0.45.

EXAMPLE VIII

To a solution of 1.94 grams of isophthalic dihydrazide dissolved in a mixture of 15 ml. of N-methylpyrrolidone, 15 ml. of hexamethylphosphoramide, and 0.6 gram of lithium chloride, cooled in an ice bath, is added dropwise over 5 minutes 2.37 grams of 5-chloroisophthaloyl chloride with stirring. After 5 hours the cooling bath is removed and stirring is continued for 1½ hours. The clear viscous solution is precipitated into water and washed with alcohol. After drying the product, the polymer melt temperature is found to be 350° C. and the inherent viscosity 0.90.

EXAMPLE IX

A solution of 30 ml. of N-methylpyrrolidone containing 1.95 grams of powdered, anhydrous pyridine-2,5-dicarboxylic dihydrazide is prepared in a dry, ice-cooled reaction flask, adapted with a stirrer, nitrogen-inlet, and a drying tube. To this solution are added 2.03 grams of pyridine-2,5-dicarbonyl chloride in several portions, and the resulting mixture is stirred overnight. It is then precipitated into ethanol, and the polymer is filtered, washed with ethanol, and dried. The polymer, poly(pyridine-2,5-dicarboxylic hydrazide), has a melt temperature of 370° C. and an inherent viscosity of 0.81.

EXAMPLE X

To a solution of 1.95 grams of pyridine-2,6-dicarboxylic dihydrazide in 25 ml. of N-methylpyrrolidone, containing 5% by weight lithium chloride, is added with stirring and cooling an amount of 2.03 grams of pyridine-2,6-dicarbonyl chloride. The reaction mixture is poured into a 50% solution of aqueous ethanol after 5 hours of reaction in the cold. The polymer, poly(pyridine-2,6-dicarboxylic hydrazide), precipitates and is washed with 95% ethanol. After drying, the polymer exhibits an inherent viscosity of 0.72 and a polymer melt temperature of 360° C.

EXAMPLE XI

Pyrazine-2,5-dicarboxylic dihydrazide, in the amount of 0.98 gram, is dissolved in 30 ml. of hexamethylphosphoramide, which is stirred and cooled. To this solution is added, in portions, 1.02 grams of pyrazine-2,5-dicarbonyl chloride. The cooled solution is stirred for 8 hours and then poured into water. The precipitate, after filtration, is washed with 95% ethanol and dried. The product thus obtained, poly(pyrazine-2,5-dicarboxylic hydrazide), exhibits an inherent viscosity of 0.72. The polymer melt temperature is found to be 350° C.

EXAMPLE XII

A 0.98 gram sample of pure pyridine-2,5-dicarboxylic dihydrazide is placed in 15 ml. of hexamethylphosphoramide. The resulting solution is cooled in an external ice bath and stirred. To this is added 1.04 grams of thiophene-2,5-dicarbonyl chloride in small portions. The total mixture is allowed to react in the cold for 10 hours, and the polymer is separated by dilution with water. The product is washed with alcohol and the resulting polymer exhibits a polymer melt temperature of 360° C. The inherent viscosity is 0.77.

EXAMPLE XIII

A solution is prepared by dissolving 0.6 gram of lithium chloride and 1.95 grams of pyridine-2,5-dicarboxylic dihydrazide in 30 grams of N-methylpyrrolidone. The total mixture is stirred and cooled in an external ice bath. To this solution are added, in small portions, 2.03 grams of pyridine-3,5-dicarbonyl chloride. The reaction is allowed to proceed overnight in the cold. The mixture is poured into 95% ethanol, and the solid polymer precipitates. When filtered, washed and dried, it exhibits an inherent viscosity of 0.62. The polymer melt temperature is found to be 360° C.

EXAMPLE XIV

The polymer of Example I, having an inherent viscosity of 0.84, is dissolved in dimethyl sulfoxide to give a spin dope containing 43% solids. This is extruded through a spinneret at a temperature of 140° C. into a column heated to 200° C. The resulting fibers are drawn 2–3 times at between 6 and 20 pounds of steam pressure and then are drawn a second time 1.95 times under 30 pounds of steam pressure. The fibers thus produced exhibit a tenacity of 4.6 g.p.d. and elongation at break of 28%, and an initial modulus of 105 g.p.d. Flex life for an 8-denier (0.9 tex.) monofilament is 180,000 cycles. The fiber exhibits excellent light stability, having a tenacity half-life in an Atlas "Fade-Ometer" of more than 600 hours. After 20 days at 200° C. more than 50% retention of properties are observed. When tested at 260° C. an 80% property retention is found, as compared with the room temperature values.

EXAMPLE XV

Polymer of Example III having an inherent viscosity of 0.88 is dissolved in dimethyl sulfoxide to give a 26% solution. This is dry spun to yield fibers which, after drawing 2 times in 8 pounds steam, having the following properties; tenacity 5.9 g.p.d., elongation 30%, initial modulus 75 g.p.d., filament denier 3.7 (0.4 tex.).

The polymers of this invention are of particular utility in the formation of films, fibers, and other shaped objects. Films and filaments of the aromatic polyhydrazides may be oriented by stretching, for example under steam, and exhibit high modulus, high tenacity, and high flex life. They are further characterized by outstanding light and thermal stability. This combination of properties indicates that the aromatic polyhydrazides of this invention are of value in numerous textile and industrial uses such as tire cords, ropes, gasketing cords, filter cloths, etc. It is found that the water wicking ability of these polymers is high, and that fabrics comprising the polymers may find utility in towelling applications. Films of the polymers of this invention are useful as protective and covering materials, as well as for wrapping purposes. The polymers of this invention provide a particularly valuable class for conversion to poly-1,3,4-oxadiazoles as disclosed in my copending application Serial No. 800,366.

What is claimed is:

1. A high molecular weight, fiber- and film-forming aromatic condensation polymer consisting essentially of the following recurring structural unit

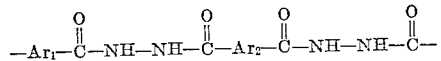

wherein Ar and Ar₂ each represents a divalent aromatic radical having at least three nuclear atoms between points of attachment and having less than 18 carbon atoms, with the proviso that less than 65 mol percent of the aromatic radicals in the polymer are paraphenylene radicals, said polymer having a melt temperature greater than 300° C. and an inherent viscosity greater than 0.4, when measured in dimethylsulfoxide at a concentration of 0.5 gram of polymer per 100 ml. of solution at 30° C.

2. The polymer of claim 1 wherein Ar is metaphenylene.

3. A high molecular weight, film- and fiber-forming aromatic polyhydrazide having the recurring structural unit

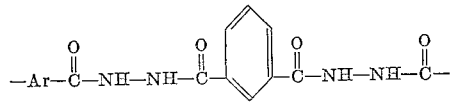

wherein Ar represents a divalent aromatic radical having at least three nuclear atoms between points of attachment and having less than 18 carbon atoms, said polymer having a melt temperature greater than 350° C. and an inherent viscosity greater than 0.5, when measured in dimethyl sulfoxide at a concentration of 0.5 g. of polymer per 100 ml. of solution at 30° C.

4. The polymer of claim 3 wherein Ar is paraphenylene.

5. The polymer of claim 1 in the form of a self-supporting film.

6. The polymer of claim 1 in the form anf an oriented fiber.

7. A spinning solution comprising 20–50% of the polymer of claim 1 and the remainder dimethyl sulfoxide.

8. A method of making the polymer of claim 1 which comprises reacting on an equimolar basis an aromatic dihydrazide in hexamehtylphosphoramide with an aromatic diacid chloride at a temperature up to about 75° C.

9. The process of claim 8 conducted at a temperature of between about 0° and 30° C.

10. A method of making the polymer of claim 1 which comprises reacting on an equimolar basis an aromatic dihydrazide in N-methylpyrrolidone with an aromatic diacid chloride at a temperature up to about 75° C.

11. A method of making the polymer of claim 1 which comprises reacting on an equimolar basis a member of the group consisting of hydrazine and an aromatic dihydrazide with an aromatic diacid chloride in an amide solvent which is substantially inert to the reactants under the conditions of the reaction.

12. Poly(pyrazine-2,5-dicarboxylic hydrazide) having a melt temperature greater than 300° C. and an inherent viscosity greater than 0.4 when measured in dimethylsulfoxide at a concentration of 0.5 gram of polymer per 100 ml. of solution at 30° C.

13. Poly(pyridine-2,5-dicarboxylic hydrazide) having a melt temperature greater than 300° C. and an inherent viscosity greater than 0.4 when measured in dimethyl sulfoxide at a concentration of 0.5 gram of polymer per 100 ml. of solution at 30° C.

References Cited in the file of this patent

UNITED STATES PATENTS

| | | |
|---|---|---|
| 2,252,555 | Carothers | Aug. 12, 1941 |
| 2,395,642 | Prichard | Feb. 26, 1946 |
| 2,544,637 | Caldwell | Mar. 13, 1951 |
| 2,615,862 | McFarlane et al. | Oct. 28, 1952 |
| 2,957,852 | Frankenburg et al. | Oct. 25, 1960 |
| 2,958,677 | Kleinschmidt | Nov. 1, 1960 |

UNITED STATES PATENT OFFICE
CERTIFICATE OF CORRECTION

Patent No. 3,130,182 April 21, 1964

August Henry Frazer

It is hereby certified that error appears in the above numbered patent requiring correction and that the said Letters Patent should read as corrected below.

Column 9, line 55, for "Ar" read -- $Ar_1$ --; column 10, line 2, for "Ar is" read -- $Ar_1$ and $Ar_2$ are --.

Signed and sealed this 18th day of August 1964.

(SEAL)
Attest:

ERNEST W. SWIDER
Attesting Officer

EDWARD J. BRENNER
Commissioner of Patents